UNITED STATES PATENT OFFICE.

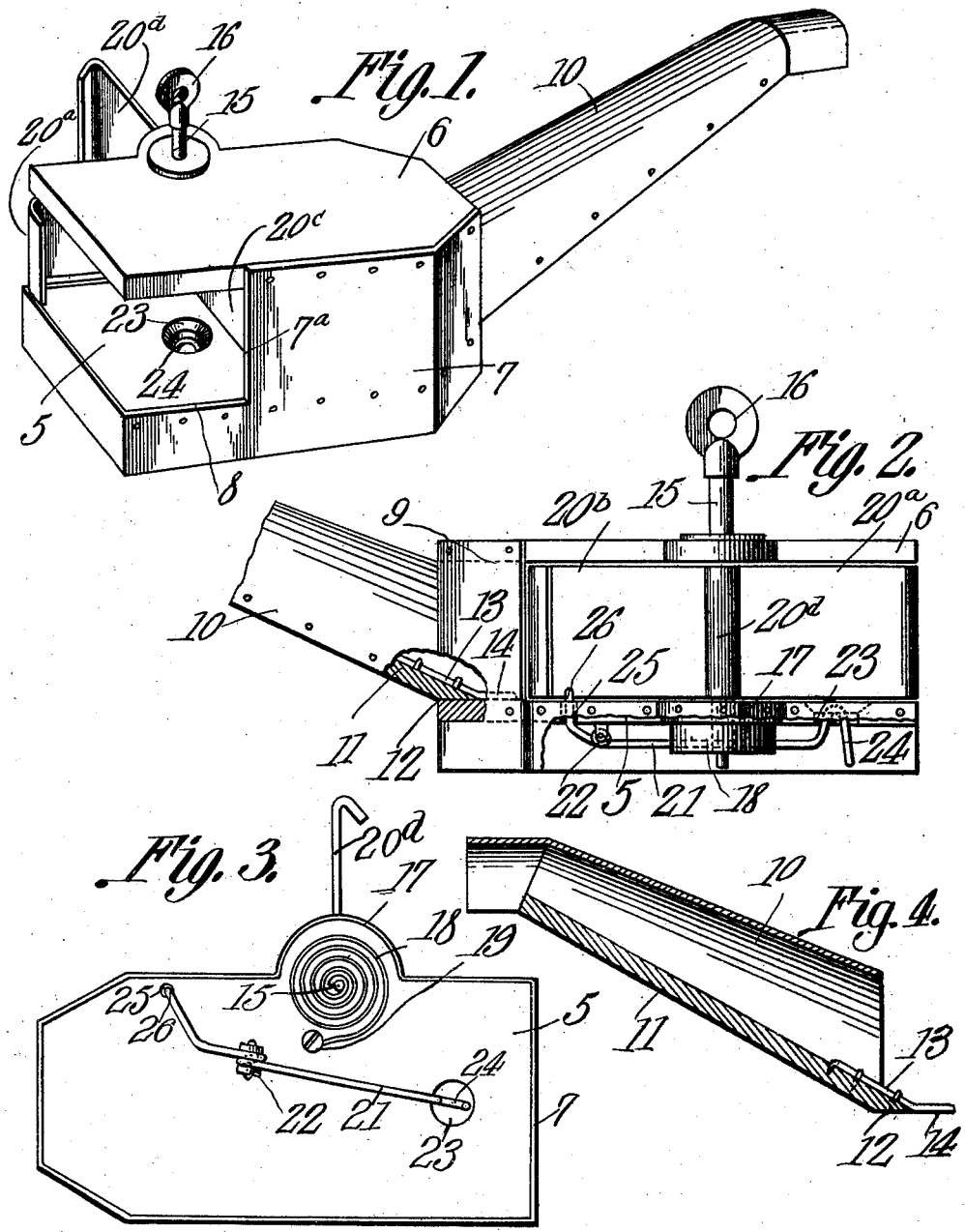

WILLIAM JOSEPH CLARK, OF SAN ANTONIO, TEXAS.

TRAP.

987,284.   Specification of Letters Patent.   Patented Mar. 21, 1911.

Application filed April 16, 1910. Serial No. 555,892.

*To all whom it may concern:*

Be it known that I, WILLIAM J. CLARK, a citizen of the United States, residing at San Antonio, in the county of Bexar and State of Texas, have invented a new and useful Trap, of which the following is a specification.

It is the object of the present invention to provide an improved construction of trap and the improvements are directed principally to a trap designed for use in catching rats.

The improvements of the present invention are directed more especially to that class of such traps in which the animal trapped is thrown by a rapidly swinging or rotating wing into a vessel containing water.

The trap embodying the present invention includes a box-like body in which is mounted a spring-rotated shaft carrying wings which are designed to be successively engaged by a trip lever arranged at one end to hold the bait, the pulling up of the bait holding lever by the rodent in its efforts to remove the bait serving to move the other end of the lever out of engagement with the wing and permit the shaft to rotate until the succeeding wing in the direction of rotation, or in other words, the next wing in the direction opposite the direction of rotation of the shaft comes into engagement therewith.

One aim of the invention is to so construct and arrange the trip lever that it will be swung to the proper degree and will quickly return to normal position immediately subsequent to its action.

In the drawings,—Figure 1 is a perspective view of the trap embodying the present invention. Fig. 2 is an elevation of the trap at that side opposite the side viewed in Fig. 1, parts being broken away. Fig. 3 is a bottom plan view of the bottom of the trap, and Fig. 4 is a vertical sectional view through the upper end of the discharge chute for the trap.

In the drawings, the box-like body of the trap is illustrated as including in its structure, a bottom 5 and a top 6 which is supported above the bottom and spaced therefrom to the proper degree by a side wall 7 which is preferably of sheet metal. For a short distance at that side of the trap viewed in Fig. 1 of the drawings, the wall 7 is omitted, as at 8, and the adjacent end of the trapping body is entirely open, as clearly shown in the said Fig. 1 of the drawings. Also, that entire side which is viewed in Fig. 2 of the drawings has the said wall 7 omitted except at its extreme front, indicated by the numeral 9. Also, the side wall 7 has its lower edge portion depending below the bottom of the box-like body so as to support the said bottom above the floor or ground upon which the trap is disposed.

The end of the box opposite the open end just mentioned is of less width than the said last mentioned end and is completely open and into this last mentioned end there is fitted one end of a chute through which the trapped animals are to be thrown by the swinging of the wings and deposited in the vessel containing the water disposed beneath the upper end of the chute. This chute has its body formed of a single sheet of metal which is bent to substantially semicylindrical form, as indicated by the numeral 10, and the bottom of this trough-like structure is closed by a flat narrow board 11 to the edges of which the lower edges of the said chute are secured. The said board 11 at the lower end of the chute projects slightly beyond the body 10 thereof and is beveled, as at 12, so as to fit against the upper side of the bottom wall 5 of the box-like body at the said end thereof and secured to the board 11 at its said beveled projecting end are wires 13 which have angularly laterally bent portions 14 projecting beyond the projecting portion 12 of the board 11 and engaging or bearing against the inner face of the bottom wall 7 on opposite sides of the said open end, it being understood that the chute is in this manner held with its lower end in proper position within the said end of the trap body.

Journaled for rotation in the top wall and bottom 6 and 5 respectively of the box-like body of the trap at that side viewed in Fig. 2 of the drawings is a shaft indicated by the numeral 15 which at its upper end is provided with a key 16 by means of which it may be turned. In the lower end of the shaft and within the concavity of a bulged portion 17 of the wall 7 at the said side of the body there is secured one end of a spring 18 which is coiled about the said lower end of the shaft and at its other end is secured, as at 19, to the under side of the floor 5 of the said body, it being understood that when the shaft is rotated in one direction it is against the tension of the spring and that upon being released, the spring in expanding, will rotate the shaft in an opposite direction. Fixed upon the shaft 15 and radiating therefrom are a number of wings, here shown as four in number, although a greater or less number may be employed if found expedient and these wings are of such dimensions that one, indicated specifically by the numeral $20^a$ in Figs. 1 and 2 of the drawings, will close one half of the open side of the body viewed in Fig. 2 of the drawings, while a diametrically opposite wing $20^b$ will close the other half of the said side, a third one of the four wings $20^c$ extending from the shaft 15 nearly to the edge $7^a$ of that portion of the wall 7 viewed in Fig. 1 of the drawings and from the floor to the top of the body, while the fourth wing $20^d$ is diametrically opposite the wing $20^c$. Before proceeding to a description of the trap means provided for controlling the rotation of the shaft and the wings thereon, it may be stated at this point that upon a single operation of the shaft, the parts being in the positions shown in Fig. 1 of the drawings, the wing $20^a$ will assume the position previously occupied by the wing $20^c$ and the wing $20^b$ will assume the position occupied by the wing $20^d$ in the said Fig. 1 of the drawings so that an animal standing upon that portion of the floor in the angle of the wings $20^a$ and $20^c$ will be struck by the wing $20^a$ and thrown through the chute 10 and into the vessel of water disposed beneath the upper end of the chute.

The trip lever for controlling the rotation of the shaft and the wings carried thereby is indicated by the numeral 21 and is pivoted, as at 22, upon the under side of the floor 5 and extends beneath the said floor toward the right hand end of the body in Fig. 2 of the drawings and at its corresponding end is bent upon itself and upwardly into an opening 23 in the bottom of the said floor 5, as indicated by the numeral 24. The opposite end of the lever is off-set and bent to project up through an opening 25 in the said floor, as indicated by the numeral 26, this opening 25 being located adjacent that side edge of the floor viewed in Fig. 2 of the drawings and opposite the side viewed in Fig. 1. The shaft 15 having been so rotated as to tightly wind the spring 18 and the end 24 of the lever having been depressed, its opposite end 26 will be brought to position to project in front of the wing $20^b$ the said wing, by reason of the tension of the spring 18, being held firmly against the said end 26 of the lever. Bait of any desired sort is fixed upon the end 24 of the lever and should an animal attempt to remove or disengage the bait, this end of the lever will be pulled up and the other end 26 will be lowered thereby moving its latter end out of the path of the wing $20^b$. The wing $20^a$ will then strike the animal and cause it to release the baited end of the lever 21 and will throw the animal down the chute 10. Inasmuch as the pivot 22 for the lever is located much nearer the end 26 of the lever than the end 24 thereof, its baited end will drop by gravity thereby raising its end 26 into the path of movement of the several wings, whereupon this end will be engaged by the wing $20^c$ when the same reaches the position previously occupied by the wing $20^b$. It will, of course, be understood that the trap may be operated a number of times until the spring 18 has been almost completely unwound so that with a single winding of the spring a number of animals may be caught.

What is claimed is:

In a trap, a body open on one side and at one end, a shaft journaled vertically at the open side of the body, a spring for rotating said shaft, wings radiating from the shaft, opposite ones of the wings closing the open side of the body and the other of the wings extending across the interior of the body when the shaft is at rest, and a trip lever having a bait holding end lying between the last mentioned wing and the open end of the body, the other end of the said lever projecting in the path of movement of the wings.

In testimony that I claim the foregoing as my own, I have hereto affixed my signature in the presence of two witnesses.

WILLIAM JOSEPH CLARK.

Witnesses:
    JOSEPH CHADWICK,
    E. I. M. RIVAS.

---

Copies of this patent may be obtained for five cents each, by addressing the "Commissioner of Patents, Washington, D. C."